United States Patent [19]

Merrill

[11] 4,029,635
[45] June 14, 1977

[54] SILICONE RESINS USEFUL FOR FORMING MICA LAMINATE

[75] Inventor: Duane F. Merrill, Ballston Spa, N.Y.

[73] Assignee: General Electric Company, Waterford, N.Y.

[22] Filed: Jan. 15, 1975

[21] Appl. No.: 541,281

[52] U.S. Cl. .................... 260/46.5 R; 156/329; 260/18 S

[51] Int. Cl.² .................... C08G 77/04

[58] Field of Search .................... 260/46.5 R

[56] References Cited

UNITED STATES PATENTS

| | | | |
|---|---|---|---|
| 3,450,672 | 6/1969 | Merrill | 260/46.5 R |
| 3,786,015 | 1/1974 | Merrill | 260/46.5 R |
| 3,790,527 | 2/1974 | Merrill | 260/46.5 R |
| 3,792,012 | 2/1974 | Zdaniewski | 260/46.5 R |
| 3,846,358 | 11/1974 | Roedel | 260/46.5 R |

Primary Examiner—Melvyn I. Marquis
Attorney, Agent, or Firm—Donald J. Voss; E. Philip Koltos; Frank L. Neuhauser

[57] ABSTRACT

A process for forming a silicone resin useful for making mica laminates comprising adding a mixture of organotrihalosilanes and dimethyldihalosilanes dissolved in a water immiscible organic solvent to a heterogeneous hydrolysis mixture composed of a water immiscible organic solvent and an alcohol and separating the solvent resin layer where the organic groups on said trihalosilane are methyl and phenyl with the mole percent concentration of the methyl groups to phenyl groups varying from 30 to 70 mole percent. The hydrolysis addition is generally carried out at a temperature of 25° C to 80° C. The resin produced by this process has an organo and methyl to Si ratio varying from 1.01 to 1 to 1.1 to 1. The alkoxy content is less than 6% by weight and, preferably, varies from 2 to 4% by weight and the silanol content is generally less than 6% by weight and preferably varies from 2 to 4% by weight.

4 Claims, No Drawings

1

SILICONE RESINS USEFUL FOR FORMING MICA LAMINATE

BACKGROUND OF THE INVENTION

The present invention relates to a process for producing silicone resins, the silicone resins themselves and, more particularly, the present invention relates to silicone resins useful in forming high quality mica laminates.

In producing silicone resin-mica laminates a solvent solution is formed with the silicone resin in which the solids content of the silicone resin may vary anywhere from 20% by weight to 75% by weight. Silicone resins that have been used for this purpose in the past are, for instance, such as those described in the patent application 8SI-1212, Ser. No. 115,715 by Duane F. Merrill, entitled Fast-Curing Silanol-Containing Organopolysiloxane Resins and a Method for Making Them and now abandoned. The procedure for making the laminates when the solids content of the solution is between 20% to 50% by weight, is to take the mica paper and immerse it in the solution. In such immersion technique the mica paper must have a 12% by weight solids pickup of the silicone resin on the mica paper.

In another procedure, when the solids content of the silicone resin solvent solution is between 50 to 75% by weight then the silicone resin solvent solution is applied to both sides of the mica paper by trickling it on the mica paper or brushing it on the mica paper. In any case, for a proper mica laminate and whichever method is applied, there must be 8 to 12% by weight of silicone resin pickup by the mica paper. The silicone resin coated mica paper is then taken and air dried for a short period of time. Then various numbers of the coated paper are put under two pressure plates (the number of mica papers being inserted being put together depends on the thickness of the mica laminate that is desired) and then the layers of mica paper between the pressure plates are heated to temperatures of 100° to 150° C under pressure varying anywhere from 100 psig to 4,000 psig for 30 minutes or more of pressing time. At the end of this period, the press is cooled and the laminate is taken out of the pressure plates and inspected for density, delamination and for blistering. If the laminate has the proper density it has a metallic sound when struck against a hard object. Then the laminate is post baked by putting it under pressure plates again and heating it in an oven at a temperature range from 100° C up to 300° C, as the post baking progresses for a period of anywhere from 8 hours to 30 hours. Upon completion of this post baking, the silicone resin mica laminate is taken out and is ready to be used.

With prior art silicone resins it was found that in some cases when the laminate was press-cured initially that the laminate blistered and after the press-cure would not have the proper pressed density. In the past, it was also found that in the post bake cycle, the laminate would not retain its press density and that in some cases the silicone resin would soften and thus produce a poor laminate. It was especially noticed that delamination occurred when the final laminate was punched or cut as is usual in fabricating articles from such laminates. In some cases such delamination and loss of press density was avoided by using the pressure plate during the post bake cycle. In another case, even this procedure was not helpful in preventing delamination or loss of press density of the final laminate during the post bake cycle.

Another problem with the production of such silicone resin mica laminates was the use of the catalyst in the silicone resin solids solution. Usually such a catalyst was a metal salt of a carboxylic acid. It was found that such catalyst, in some cases, would cause the silicone resin to cure too quickly and in some cases would not cause the silicone resin to cure with sufficient rapidity. Accordingly, there is a need in the mica laminate art for silicone resins which, when a mica laminate is formed from it, will retain 90% of its pressed density during the post cure cycle, will not blister during the post cure cycle even in the absence of pressure plates and in which the final laminate will not delaminate or come apart upon the mica laminate being cut or punched.

Accordingly, it is one object of the present invention to provide a process which is economical and efficient for producing a silicone resin useful for forming mica laminates.

It is an additional object of the present invention to provide a process for producing a silicone resin which can be utilized to make mica laminates such that the mica laminates will not delaminate and have the proper pressed density upon the mica laminate being punched or handled in various ways to fabricate articles therefrom.

It is yet another object of the present invention to provide a silicone resin and catalyst which is useful in forming a mica laminate, which mica laminate does not have to be put under pressure plates during the post bake cycle where the mica laminate will retain 90% of its pressed density and will not blister or delaminate upon use.

It is still another object of the present invention to provide a process for making a silicone resin laminate where upon preparation the laminate will retain 90% of its pressed density, will not blister upon preparation and will not delaminate during the formation of the laminate.

This, and other objects of the present invention, are accomplished by means of the disclosure set forth herein below.

SUMMARY OF THE INVENTION

There is provided by the present invention a process for forming a silicone resin useful for making a mica laminate comprising adding a mixture composed of an organotrihalosilane and a dimethyldihalosilane dissolved in a water immiscible organic solvent to a heterogeneous hydrolysis mixture composed of a water immiscible organic solvent, water, and an alcohol where there is present in the hydrolysis mixture per part of silanes, 0.4 to 10 parts of the water immiscible organic solvent, 0.2 to 1.0 parts of water and 0.5 to 1.5 parts of the alcohol. The mixture is continuously agitated during addition of the halosilanes and they are added over a period of 15 minutes to 4 hours. At the end of the addition period the mixture is again agitated for some period of time varying from 15 minutes to one-half hour until there is complete reaction. Then there is added additional water to form two layers and the water layer is separated from the solvent layer. After this, additional amounts of water and mixtures of water and alcohol can be added to the solvent resin layer and the water and alcohol are distilled off to leave behind the silicone resin solvent layer containing less than 10 parts per million of acid.

The resin to be useful for the present purpose for forming mica laminates, the diorganosiloxy difunctional units must have as organic substituents, only methyl radicals. The organosiloxy trifunctional units of the resin must have substituent organo radicals, radicals selected from a mixture of methyl and phenyl radicals where the concentration of the methyl radicals in the trifunctional unit varies from 30 to 70 mole percent and preferably varies from 40 to 60 mole percent.

The methyl and phenyl to Si ratio in the resin must vary from 1.01 to 1 to 1.1 to 1. The organic substituent radicals of methyl or phenyl as stated above for the difunctional units and trifunctional units in the silicone resin must be within the ratio identified above and only this ratio. Such a resin, in addition, must have an alkoxy content of less than 6% by weight and preferably 2 to 4% by weight and a silanol content of less than 6% by weight and preferably 2 to 4% by weight.

There is also encompassed within the present invention silicone resin-mica laminates and a process for making such silicone resin-mica laminates which will not delaminate and retain 90% of their pressed density upon post cure in which there is applied to mica paper a solution of the above silicone resin dissolved in a water-immiscible organic solvent which water-immiscible organic solvent may be xylene, toluene, benzene and etc. at a solids content of anywhere from 20.0% to 75% by weight of silicone resin. The mica paper so exposed to the silicone resin solids solution must pickup 8 to 12% by weight of the silicone resin solids. The resulting mica papers are oven dried and placed together between pressure plates and heated at elevated temperatures for a period of time varying from one-half to 5 hours and then the laminate is cooled and removed from the pressure plates. The laminate that is formed is then taken and put in an oven and heated beginning at 100° C at increments of temperature increase of 25° per hour for a period of time varying anywhere from 8 hours to 30 hours. The laminate is post cured until the silicone resin is completely cured to form a mica laminate which in the post cure without the use of pressure plates does not blister, retains 90% of its initial pressed density and does not delaminate upon handling.

It is also critical in forming such mica laminates that with such silicone resin solution there must be a catalyst in which it is necessary that the catalyst be a metal salt of a monocarboxylic acid or a metal salt of a dicarboxylic acid and is preferably a zinc salt of a monocarboxylic acid. It has been found that it is critical in the present invention that such catalyst must be used at a concentration of .05 to 0.4% by weight of the silicone resin solids and more preferably is used at a concentration of 0.1 to 0.3% by weight of zinc based on said silicone resin solids.

Accordingly, this invention and processes will be more fully described herein below.

DESCRIPTION OF THE PREFERRED EMBODIMENT

To produce the advantageous resin of the present case, there is hydrolyzed a mixture of monoorganotrihalosilane and dimethyldihalosilane, the halogen preferably being chlorine. These silanes have the formula $R\ SiX_3$ and $(CH_3)_2SiX_2$ where X is preferably chlorine and the monoorganic group is selected from methyl and phenyl.

It must be appreciated that it is necessary in the silane reactants of the present case that there be only methyl and phenyl organic substituents such that the final resin will only have methyl and phenyl organic substituents plus alkoxy substituents and silanol substituents attached to the silicon atom. The monoorganotrihalosilane can have as organic substituents for the organo group, that is, the R group in the above formulas, only methyl and phenyl where generally the methyl concentration as compared to the phenyl in the organotrihalosilane varies from 30 to 70 mole percent and preferably varies from 40 to 60 mole percent. The other organic substituent in the monoorganotrihalosilane is phenyl. These concentrations of methyl and phenyl in the organotrihalosilane are critical if the desired resin of the present case is to be produced.

In addition, the difunctional group, that is, the dihalosilane, can only have methyl substituents and none other. For instance, a diphenyl or any amount of diphenyldihalosilane in the reactants is extremely undesirable and will not produce the advantageous resin of the present case. Accordingly, it is critical to the silicone resin of the present invention which is extremely useful for forming mica laminates that there only be present as a reactant a dimethyldihalosilane. The amount of monoorganotrihalosilane to dimethyldihalosilane is adjusted so that in the final resin that is produced there will be a methyl and phenyl to silicon ratio varying from 1.01:1 to 1.1:1.

Again, in the resin of the present case, it is extremely important that the organo substituent group to silane ratio be maintained precisely otherwise the silicone resin produced will not have the advantageous properties for forming mica laminates which were enumerated above.

There is prepared a mixture of the proper amounts of monoorganotrihalosilane and dimethyldihalosilane and the resulting mixture is dissolved in a water-immiscible organic solvent. The halosilanes and preferably chlorosilane mixture is hydrolyzed to produce a resin in a heterogeneous high acid hydrolysis medium. Per part of halosilane there will be a heterogeneous hydrolysis medium containing 0.5 to 1.5 per part of alcohol of the formula $R^4OH$, where $R^4$ is selected from alkyl, haloalkyl and cyanoalkyl radicals of 1 to 3 carbon atoms, 0.4 to 10.0 parts of a water-immiscible organic solvent and 0.2 to 1.0 parts of water. As has been stated previously, some of the water-immiscible solvent that is to be present in the heterogeneous hydrolysis mixture is used to dissolve the organohalosilanes. Then the solvent mixture is added to the heterogeneous hydrolysis medium composed of the rest of the water-immiscible organic solvent, the alcohol and the water. It is only necessary that in the final hydrolysis medium there be the amount of reactants and hydrolysis agents set forth above. In the above recitation of concentration of ingredients, part is by weight.

The halosilane water-immiscible solvent mixture is added slowly to the heterogeneous hydrolysis medium over a period of time varying anywhere from 15 minutes to 4 hours. It is preferable that the water-immiscible organic halosilanes solvent mixture be added slowly to the heterogeneous hydrolysis medium so as to assure proper reaction of the halosilanes. In such addition, the temperature of the heterogeneous hydrolysis medium should be maintained anywhere from 25° to 80° C. It is preferred not to go below 25° C since this requires refrigeration or coolant means to be applied to the reaction vessel. On the other hand, it is desired not to go above 80° C since then the reaction of the hydrolysis of the organohalosilane becomes too violent and some of the silanes may be boiled off. In addition, in a temperature reaction above 80° C there is always the possibility of undesirable side reactions.

The water-immiscible organic solvent that may be utilized in the above hydrolysis may be any water-immiscible organic solvent such as toluene, xylene, benzene, cyclohexane, heptane, octane, naphtha, and other well known water-immiscible organic solvents. It is preferred to utilize xylene or toluene since these solvents while flammable are not too toxic and have the proper solvent abilities in terms of dissolving the halosilanes in them as well as for the purpose of dissolving the final silicone resin that is formed in the heterogeneous hydrolysis medium so as to facilitate separation from the water-acid medium that is formed in the hydrolysis. After addition of the total amount of organohalosilanes has taken place, the reaction mixture at elevated temperatures is preferably lowered to room temperature while the hydrolysis medium is continually agitated from anywhere from 15 minutes to 1 hour so as to assure complete reaction of the organohalosilanes. After the agitation has been completed, then there is added water to form two phases and the phases are allowed to separate and the acid containing water layer is separated from the silicone resin solvent layer. To the separated silicone resin solvent layer there is added a sufficient quantity of water of anywhere from 1 part to 10 parts of water per part of silicone resin solids and the mixture is again agitated for a period varying from 15 minutes to 1 hour. This second addition of water is for the purpose of stabilizing the newly formed silicone resin and also for the purpose of dissolving any acid that might be present in the silicone resin solvent layer. After the agitation is completed then the water is distilled off at elevated temperatures, that is, preferably at the reflux temperature of the solvent present in the silicone resin solvent layer. After the distillation of the water from the mixture is completed, the silicone resin solvent layer is tested for acidity. If the acidity exceeds 10 parts per million then there is added to the solvent silicone resin mixture 1 part to 5 parts of alcohol and from 1 part to 10 parts of water per part of silicone resin in the solvent silicone resin phase. The alcohol-water mixture generally contains 30 to 70% by weight of alcohol. This mixture of alcohol, water and the silicone resin in the solvent layer is agitated from 15 minutes to 1 hour and then is heated to the reflux temperature of the solvent at which point there is distilled off the alcohol and water. At the end of this distillation period which can take anywhere from 30 minutes to 2 hours there is left behind the solvent in the silicone resin layer having less than 10 parts per million of acid in it, and preferably less than 5 parts per million of acid in it. The acid content of the silicone resin solvent layer must be reduced to below 10 parts per million if the resin is to be stable and form proper laminates with mica paper. If the acid content is above 10 parts per million when there is formed a mica laminate the silicone resin will not cure properly and there will be delamination in the mica laminate that is formed.

The silicone resin that is thus formed has a methyl and phenyl to Si ratio varying from 1.01:1 to 1.1:1. Such a silicone resin produced by high acid hydrolysis and under the above reaction conditions, as specified above, will generally have less than 6% weight of silanol groups and preferably have a silanol content varying from 2 to 4% by weight. Such a silicone resin will also have a hydrocarbonoxy or alkoxy content generally less than 6% by weight and preferably have a hydrocarbonoxy or alkoxy content of 2 to 4% by weight.

It is critical in the present invention that the final silicone resin produced, as described above, be composed of monomethylsiloxytrifunctional units and monophenylsiloxytrifunctional units where in the total trifunctional units the concentration of the monomethylsiloxytrifunctional units varies generally from 30 to 70 mole percent and preferably varies from 40 to 60 mole percent.

With respect to the difunctional units in the resin of the present case, it is critical that there be present only dimethylsiloxydifunctional units, such that the organo substituent to Si ratio in the final resin varies from 1.01:1 to 1.1:1, as has been stated previously. With the silicone resin produced in a water-immiscible solvent layer as stated above, where the acid content is less than 10 parts per million the resin is ready to be utilized to form mica laminates.

An additional method for testing the silicone resin to see whether it is in proper form for making mica laminates is to take a small portion of it and put it on a hot plate maintained at 200° C. The silicone resin must gel between from 10 minutes to 30 minutes after it has been put on the hot plate. This is referred to as the 200° stroke cure test and the silicone resin produced in accordance with the process described above meet the requirements of this test, as will be set forth herein below in the examples.

After the silicone resin has been tested to see whether it meets the 200° stroke cure test, the silicone resin solids solvent solution is ready to be utilized. This solution may be cut to the proper amount of solids either by evaporation of solvent or by the addition of additional solvent to the system. Other solvents that may be added to the system for the purpose of producing the desired silicone resin solids content are such solvents such as, naphtha (that is, various commercial grades of naphtha), chlorinated solvents as well as the water-immiscible organic solvents given before.

The solids content of the silicone resin in the solvent is adjusted to anywhere from 20% by weight solids to 75% by weight of solids. There are two methods of applying silicone resin to mica paper so as to impart a certain amount of silicone resin onto the mica paper so as to produce mica laminates. One is where the silicone resin solvent solution is trickled onto first one side and then the other side of the mica paper. The other method is by totally immersing the mica paper in the silicone resin solvent solution. Accordingly, if the immersion method is used, then the solids content of the silicone resin solvent solution is recommended to be between 20 to 50% by weight of solids. If the trickling method is used then the solids content of the silicone resin solids solution is recommended to be between 50 to 75% by weight of solids.

There is added at this time to the silicone resin solids solution a catalyst for curing the silicone resin. The catalyst that must be used is a metal salt of a monocarboxylic acid or a dicarboxylic acid of metals ranging from lead to manganese in the electromotive series of metals such metals being zinc, manganese, iron, tin, lead and cobalt. Preferably, there is used a metal salt of a monocarboxylic acid and more preferably the metal is zinc, that is, a zinc salt of a monocarboxylic acid.

The concentration of catalysts to silicone resin solids is another critical feature of the present invention. A proper laminate will not be formed, that is, delamination will occur if too much catalyst is used, per silicone, resin solids, and on the other hand there will not be sufficient curing if too little catalyst is utilized with the silicone resin. Accordingly, there is generally utilized from 0.05% to 0.4% by weight of the metal based on the silicone resin solids in the solution of a metal salt of a monocarboxylic acid. The above concentration range is given in terms of the metal content of the catalyst based on the weight of silicone resin solids in the silicone resin solids solution. More preferably, the catalyst is utilized at a concentration of 0.1 to 0.3% by weight of metal ion based on silicone resin solids in solution. As has been stated previously, the concentration of catalysts is critical to preparing proper mica laminates in accordance with the present invention. Once the catalyst has been dispersed into the silicone resin solids solution and adjusted to the proper solids content then the mica paper is immersed and the silicone resin solution is trickled onto the mica paper such that the mica paper has picked up anywhere from 5 to 15% by weight of silicone resin solids based on the weight of the mica paper. Preferably, the amount of silicone resin solids picked up is in the range of 8 to 12% by weight. The mica paper is then taken and air dried for anywhere from 5 minutes to 15 minutes to remove the solvent. It also may be put in an oven and heated at temperatures of 300° F for anywhere from 5 minutes to 30 minutes and preferably from 5 minutes to 15 minutes in an air oven maintained at 300° F. When the mica paper has been so dried so as to remove the solvent from the silicone resin that has been deposited on the mica paper the paper is ready to be laminated. To accomplish this the appropriate numbers of mica papers are stacked up on top of each other between pressure plates which may be either steam operated pressure plates or electrically operated pressure plates. It is common in this industry to have steam operated pressure plates.

Accordingly, when the requisite number of coated mica papers have been placed between the pressure plates, they are then subjected to pressures of anywhere from 100 psig to 4000 psig during which time the mica papers are heated at temperatures varying anywhere from 25° C up to 150° C and preferably at a temperature in the range of 100 to 150° C. This application of pressure and heating is carried out for a period of time of anywhere from 30 minutes to 5 hours and preferably from 30 minutes to 2 hours during which time the laminate is heated. This step in the process produces the mica laminate by pressure and partial curing of the silicone resin. The amount of pressure that is applied can vary and will be utilized depending on the thickness of the laminate that is desired. At the end of the period of 30 minutes to 5 hours or preferably 2 hours the pressure is released and the laminate that is formed is cooled to room temperature. The laminate after it has been cooled to room temperature is checked to see if there is any blistering. Also, the laminate is tested by striking against a hard object. In the resins and laminates produced by the process of the present case there is essentially no blistering on the mica laminates formed by the process of the present case and when the laminate is struck against a hard object there is a metallic sound indicating that it has the proper density.

At this time it is necessary to post bake the laminate in accordance with the process of the present case so as to fully cure the silicone resin that is used to make the laminate. In the prior art processes pressure plates were needed again in the post baked heating cycle. In the process of the present case pressure plates are not needed to prevent delamination in the post baking procedure. Accordingly, the mica laminates formed with the present process are placed in an oven and heated beginning at 100° C at temperatures varying from 100° to 300° C with an increase of 25° per heating hour, up to a maximum of 300° C. Accordingly, the mica laminates of the present invention are so heated for a period of time varying from 8 hours to 30 hours and at the end of the time they are taken out of the oven and tested.

Mica laminates formed with the silicone resin of the present case after the above post baking cycle, as discussed above, retain their metallic sound upon being hit against a hard object indicating that they retained at least 90% of their press density and there is no blistering on the laminate.

In addition, laminates so formed do not delaminate during the process of formation in accordance with the procedure for preparing the silicone resin and for preparing the laminate as described above.

In addition, the mica laminates that are formed in accordance with the present process when punched, cut or broken do not delaminate.

The examples given below are for the purpose of illustrating the process of the present case for forming silicone results and for forming mica laminates with such silicone resins and are given to illustrate the process of the present invention. Such examples are not intended in any way or manner to define the breadth of the present invention. All parts in the examples are by weight.

In Example 3, the resin, X-M, identified therein is a resin composed of 47 mole percent of monomethylsiloxytrifunctional units, 48 mole percent of monophenylsiloxytrifunctional units and 5 mole percent of dimethylsiloxydifunctional units. Such a resin contains 8% of silanol groups and no alkoxy or hydrocarbonoxy substituent groups. Such resin is produced by hydrolyzing in a low acid heterogeneous hydrolysis medium appropriate halosilanes where the heterogeneous hydrolysis medium contains water, acetone and a water-immiscible organic solvent, such as the ones indentified in the present specification.

As Example 3 illustrates, the resin formed in an acetone medium in a low acid hydrolysis is unsuitable for preparing mica laminates since the mica laminates that are formed with such silicone resins easily delaminate.

The process for forming such silicone X-M resin utilized in Example 3 below is more fully set forth in the patent application of Duane F. Merrill, Ser. No. 115,715, filed Feb. 16, 1971 and now abandoned.

EXAMPLE 1

There was charged to a reaction flask equipped with a condenser, acid scrubber, agitator and thermometer 855 parts of toluene, 560 parts of water and 2190 parts of isopropyl alcohol. There was added to the mixture in the reaction flask a silane blend consisting of 1,005 parts of methyltrichlorosilane, 1,779 parts of phenyltrichlorosilane, 216 parts of dimethyldichlorosilane and 855 parts of toluene. The rate of addition was controlled for 50-70 minutes. The reaction temperature rose from a starting temperature of 25° C to a peak temperature of 80° C and cooled to 45° C with the absorption and evolution of hydrochloric acid. The mixture was stirred for 15 minutes. Following the fifteen minute stirring after completion of the silane addition, 1,500 parts of water was added to the mixture in the reaction flask and agitated for 10 minutes. The agitation was stopped and the mixture was allowed to settle. The resinous layer settled to the bottom and was drawn off. The upper acid water layer was discarded. The resin layer was charged to a flask equipped with a condenser, thermometer and agitator. There was charged to the resin 120 parts of water. The mixture was heated to reflux and the water was trapped off. The acid content of the resin was measured and found to be greater than 10 parts per million. The resin was cooled and there was charged to the resin 120 parts of water and 120 parts of isopropyl alcohol. The mixture was heated to reflux and the water-alcohol mixture was trapped off. The acid content of the resin was measured and found to be less than ten parts per million. The solvent was then removed to 165° C. The resin was cooled and cut with 500 parts of VM&P naphtha (Amsco Special Naphthalite) and filtered through a mixture of Celite and Fuller's Earth. The resin solution was further adjusted to 70% in VM&P naphtha and to 60% solids in toluene. The resin solution was catalyzed with 0.1% zinc based on resin solids using 8% zinc octoate. The 200° C stroke cure was found to be seventeen minutes. The catalyzed solution was cut to 25% solids with toluene for coating mica paper.

Five 5 × 8 pieces of Cogebi, 10 Mil. amber mica paper was immersed in the resin solution. The excess solvent was drained off of the paper. The saturated paper was air dried for five minutes and then the coated paper was placed in a 300° F oven for 15 minutes to remove the remainder of the solvent. Then five pieces of coated mica paper were stacked between teflon coated release cloth and press plates. The stack was placed in a steam heated 270° F press for 45 minutes at 200 psi. The press was opened just prior to cooling to release any trapped in volatiles. The pressure was reapplied and the press was cooled to room temperature before removing the laminate. The laminated board was tested for density by striking it against a hard object. The board had a metallic sound. (This test for density is accepted throughout the mica laminating business). The board was then placed in a 100° C oven for post-baking to fully cure the silicone resin. The temperature was raised 25° C each hour up to 300° C. After one hour at 300° C, the board was removed and tested for density. It was found that the laminate retained approximately 90% of the press density. The board was further tested for sheering and punching quality. The sheered and punched edges were clean. No delamination in the punched areas were observed. The board was flexed until broken and examined for inter-lamination bond. The board did not delaminate under these test conditions.

EXAMPLE 2

Resin made following Example 1 was catalyzed with 0.5% zinc based on resin solids and adjusted to 25% solids in toluene. A mica laminate was made as shown in Example 1. Following the post-bake cycle parts were punched out of the board. The board completely delaminated. This example shows the detrimental effect of excess zinc octoate on the bond strength of the resin to mica.

EXAMPLE 3

A mica laminate was made following the procedure shown in Example 1 using a standard binder resin X-M. The resin was diluted to 25% solids in toluene and catlayzed with 0.1% zinc based on resin solids using 8% zinc octoate. Following the post-bake cycle the laminated plys completely delaminated.

EXAMPLE 4

There was charged to a reaction flask equipped with a condenser, acid scrubber, agitator and thermometer 730 parts of isopropyl alcohol, 297 parts of water and 113 parts of toluene. There was added to the mixture in reaction flask a silane blend consisting of 439 parts of methyltrichlorosilane, 226 parts of phenyltrichlorosilane, 113 parts of diphenyldichlorosilane and 222 parts of toluene. The rate of addition was controlled for 50-70 minutes. The reaction temperature rose from a starting temperature of 25° C to a peak temperature of 80° C and cooled to 50° C with the absorption and evolution of hydrochloric acid. The mixture was stirred for 15 minutes. Following the fifteen minute stirring after completion of the silane addition 401 parts of water was added to the mixture in the reaction flask and agitated for 10 minutes. The agitation was stopped and the mixture was allowed to settle. The resinous layer settled to the bottom and was drawn off. The upper acid water layer was discarded. The resin layer was charged to a flask equipped with a condenser, thermometer and agitator. There was charged to the resin 30 parts of water. The mixture was heated to reflux and the water was trapped off. The acid content of the resin was measured and found to be greater than 10 parts per million. The resin was cooled and there was charged to the resin 15 parts of water and 15 parts of isopropyl alcohol. The mixture was heated to reflux and the water-alcohol mixture was trapped off. The acid content of the resin was measured and found to be less than 10 parts per million. The solvent was then removed to a batch temperature of 125° C. The resin was adjusted to approximately 60% solids with toluene and filtered through Celite and Fuller's Earth. The filtered solution was finally adjusted to 60% solids with toluene. The resin solution was catalyzed with 0.1% zinc based on resil solids using 8% zinc octoate. The 200° C stroke cure was found to be 13 minutes. The catalyzed solution was cut to 25% solids with toluene for coating mica paper.

A mica laminate was made following the procedure shown in Example 1. The mica laminate delaminated and blistered during the post-bake of the board to cure the resin.

The silicone resin in this example was unsuitable for forming mica laminates because it contained diphenylsiloxydifunctional units in it. As stated previously, organosiloxydifunctional units other than dimethylsiloxy units is completely undesirable in the silicone resins of the present case for forming mica laminates. The silicone resins so formed when used to produce mica laminates would result in a mica laminate that blisters during the process of formation. As explained previously in defining the silicone resin of the present case, the only diorganosiloxydifunctional units that may be present in the silicone resins of the present case for forming desirable mica laminates are only dimethylsiloxydifunctional units.

I claim:

1. A process for forming a silicone resin useful for making mica laminates consisting essentially of (a) adding a mixture of an organotrihalosilane and a dimethyldihalosilane dissolved in a water-immiscible organic solvent to a heterogeneous hydrolysis mixture consisting of water, a water-immiscible organic solvent and an alcohol of the formula $R^4OH$ for a period of 15 minutes to 4 hours where there is present in the hydrolysis mixture per part by weight of said organotrihalosilane and dimethyldihalosilane 0.4 to 10.0 parts of the water-immiscible organic solvent, 0.2 to 1.0 parts of water and 0.5 to 1.5 parts of said alcohol; (b) continuously during and after said addition, agitating said mixture while maintaining the reaction temperature in the range of 25° C to 80° C (c) adding additional water to form two distinct separate layers, and (d) separating the solvent resin layer where said organo groups on said organotrihalosilane are methyl and phenyl where the concentration of said methyl radicals in said organotrihalosilanes varies from 30 to 70 mole percent and $R^4$ is selected from the class consisting of alkyl radicals haloalkyl radicals from 1 to 3 carbon atoms where the organo and methyl to Si ratio in said resin varies from 1.01 to 1 to 1.1 to 1, the alkoxy content is less than 6% and said resin has a silanol content of less than 6%.

2. The process of claim 1 wherein step (b) is carried out for 15 minutes to 1 hour after the addition of halosilanes to said hydrolysis mixture.

3. The process of claim 1 further comprising stabilizing the resin by mixing into the solvent-resin layer a first quantity of water, thoroughly mixing the water into the solvent-resin layer distilling the mixture to remove the water and acid, then adding a second quantity of 30 to 70% by weight of alcohol of an alcohol-water mixture to said solvent-resin mixture, agitating the mixture thoroughly, distilling off said water-alcohol and residual acid until the acidity of the solvent-resin layer is less than 10 parts per million and adjusting the solids content of the solvent-resin solution to from 2.5 to 75% solids.

4. The process of claim 1 wherein the water-immiscible organic solvent is selected from the class consisting of toluene, xylene, benzene, cyclohexane, heptane and octane.

* * * * *